June 4, 1929.  S. HALVORSEN  1,715,916
CLUTCH DEVICE
Filed Dec. 20, 1924  3 Sheets-Sheet 1
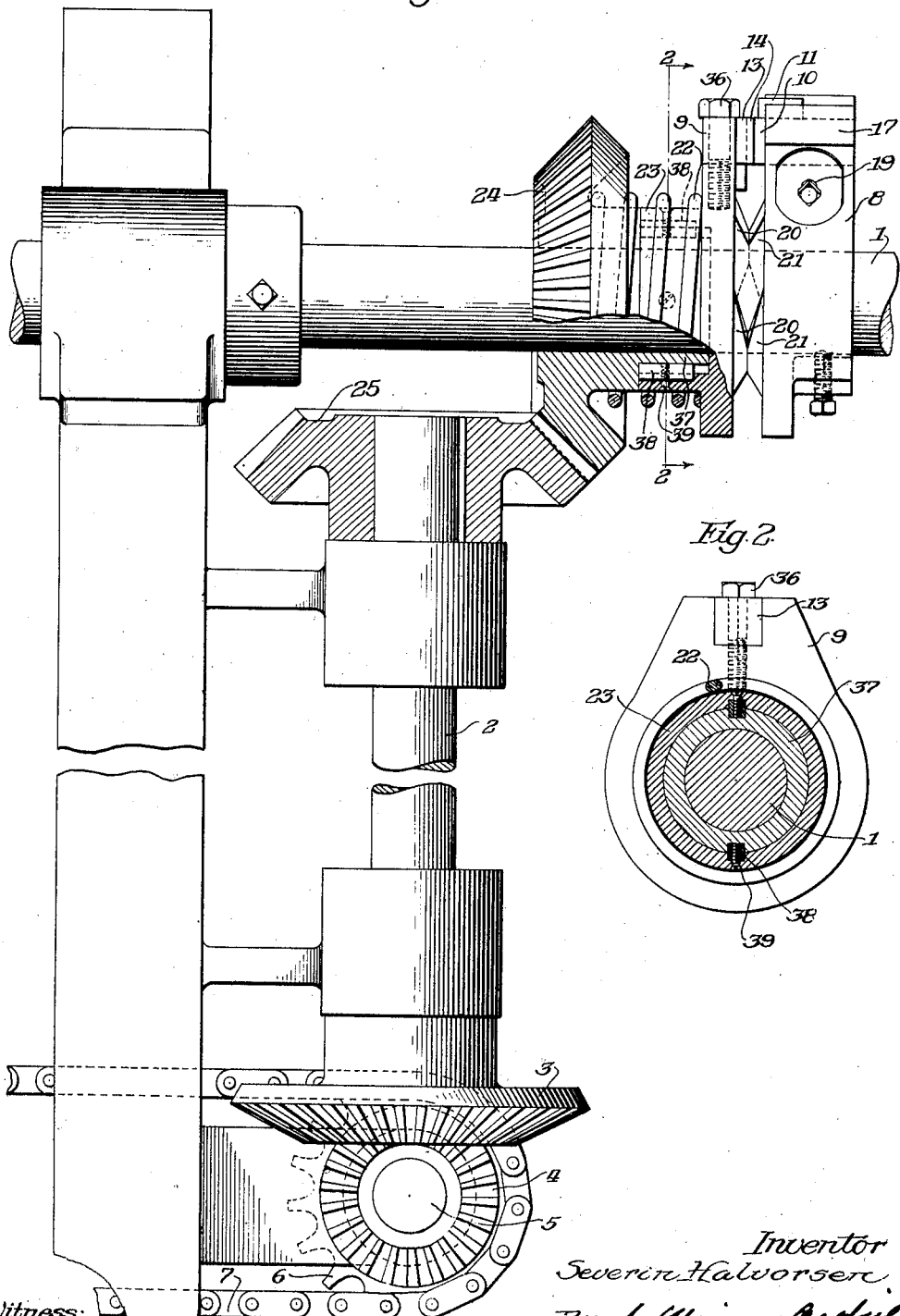

June 4, 1929.   S. HALVORSEN   1,715,916
CLUTCH DEVICE
Filed Dec. 20, 1924   3 Sheets-Sheet 2
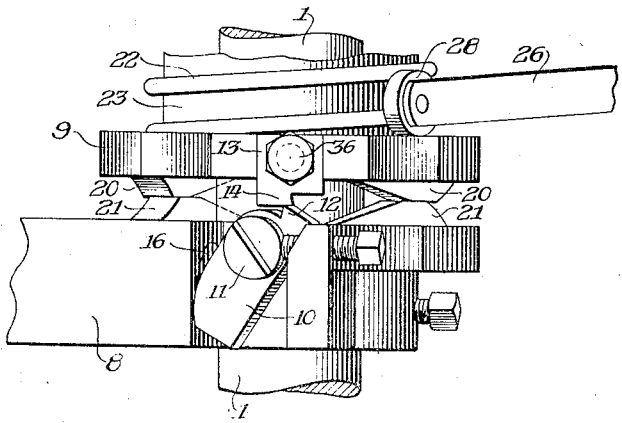
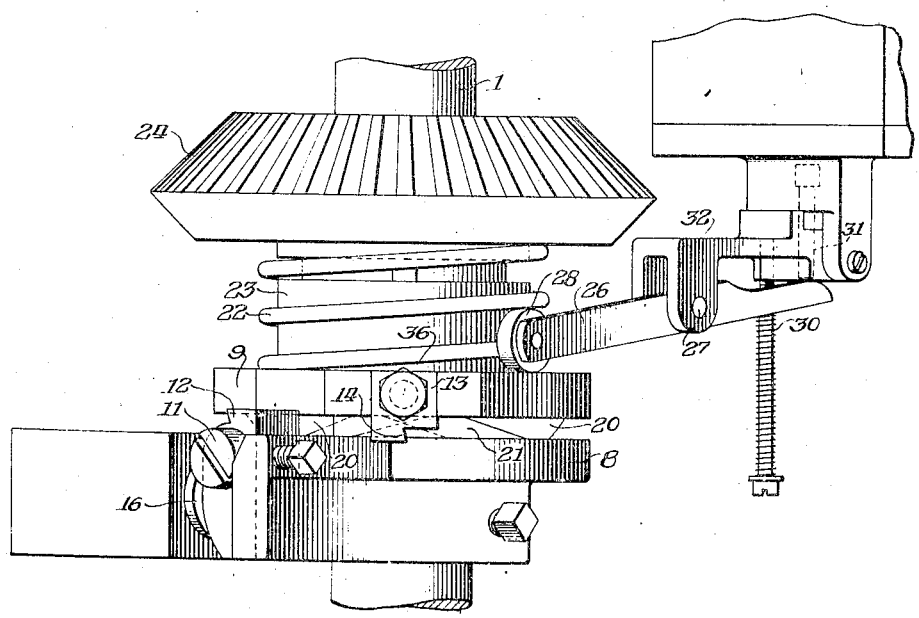

June 4, 1929.   S. HALVORSEN   1,715,916
CLUTCH DEVICE
Filed Dec. 20, 1924   3 Sheets-Sheet 3

Inventor:
Severin Halvorsen

Patented June 4, 1929.

1,715,916

UNITED STATES PATENT OFFICE.

SEVERIN HALVORSEN, OF CHICAGO, ILLINOIS, ASSIGNOR TO THE NEWSPAPER STUFFING MACHINE COMPANY, OF SEATTLE, WASHINGTON, A CORPORATION OF WASHINGTON.

CLUTCH DEVICE.

Application filed December 20, 1924. Serial No. 757,101.

My invention relates to clutch devices.

The object of the invention is to provide a simple, practical and efficient construction of clutch device, which will automatically stop a machine upon the occurrence of a condition similar to an overload.

In the accompanying drawings Fig. 1 is a view partly in elevation and partly in section of a clutch device embodying my invention;

Fig. 2 is a cross section taken on line 2—2 in Fig. 1;

Figs. 3, 4, 5 and 6 are views of the operative parts of the device in different positions.

Figure 5:
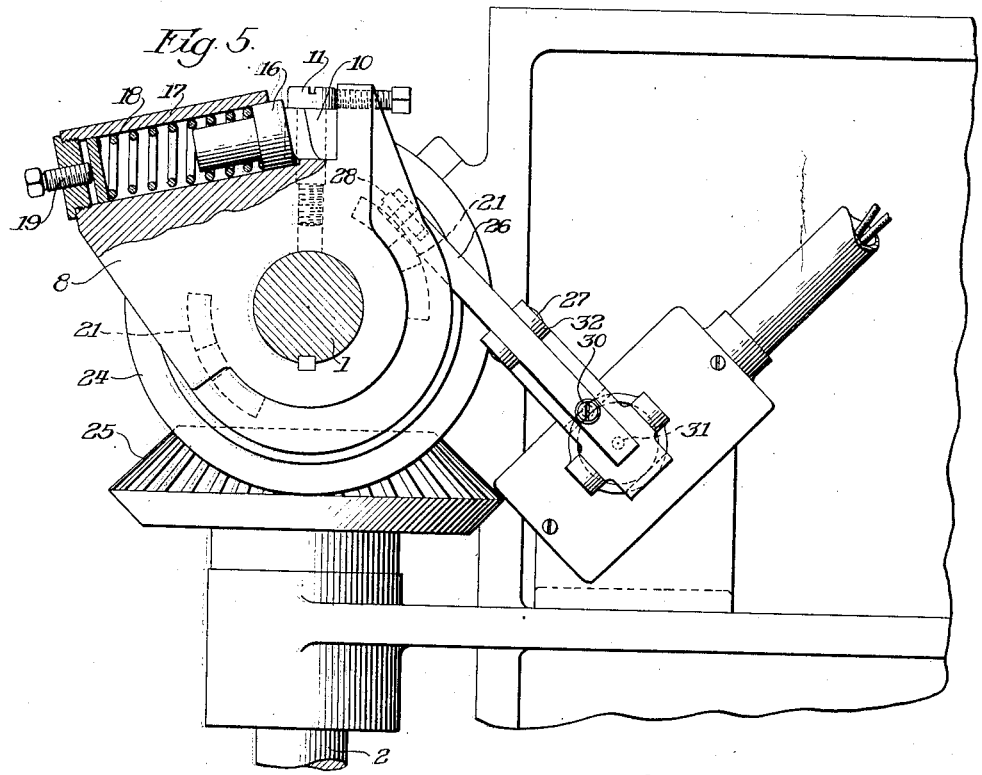
Figure 6:
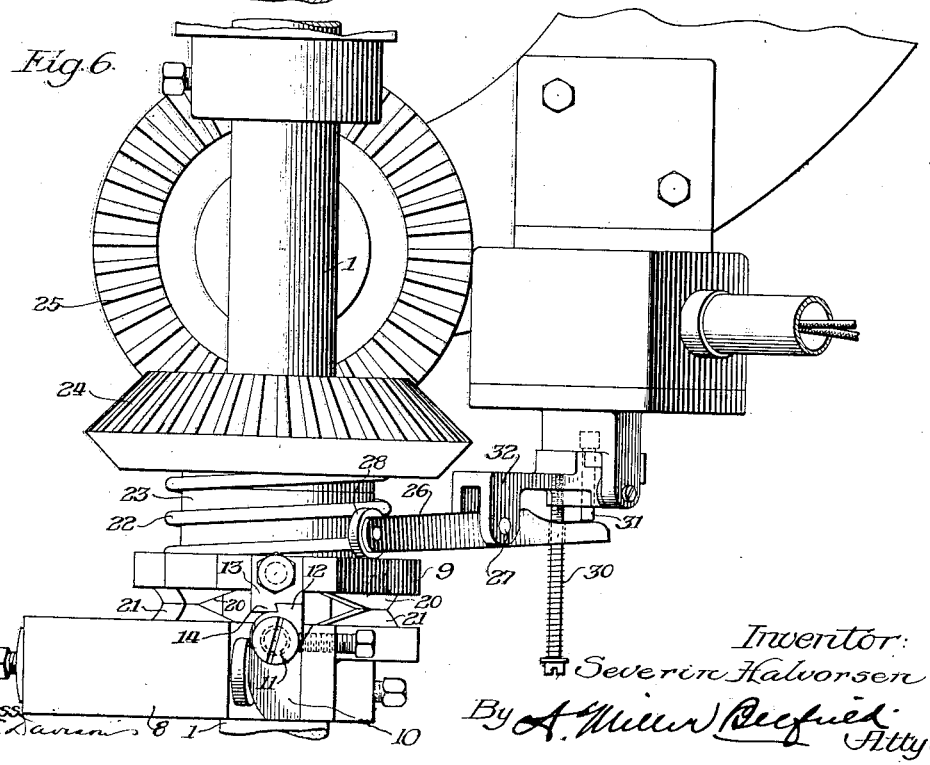

In the drawings 1 represents the drive shaft of a machine or mechanism to be equipped with the clutch. 2 represents a driven shaft which is to be driven by the drive shaft 1 and which is shown provided with a gear 3 driving a pinion 4 on a shaft 5, which latter also carries a sprocket wheel 6 actuating a sprocket chain 7. The sprocket chain 7 is understood to extend to one or more mechanisms forming part of the machine or apparatus driven by the drive shaft and constituting the load of the latter. The clutch of my invention is interposed between the drive shaft 1 and driven mechanisms actuated by shaft 2 and sprocket chain 7 so that in case of an overload on said mechanisms, either by reason of said mechanisms being given too much work to do, or by reason of some jamming or clogging of the parts or otherwise, such condition of overload will automatically operate the clutch and it will automatically control the driving mechanism such as an electric motor, so as to automatically stop the machine and thereby prevent injury or damage from overload or jamming.

The clutch comprises a fixed member 8 fast on drive shaft 1, and a loose member 9 loose on drive shaft 1. Member 8 is provided with a swinging lug or dog 10 pivoted at 11 and having a projecting end or shoulder 12, and loose member 9 has a somewhat corresponding lug or dog 13 fixed on said member 9 and having a projection or shoulder 14 engaging shoulder 12 on member 10. The engagement of these shoulders 12 and 14 causes the engagement of drive shaft 1 with the driven parts, and the driving of the latter occurs by reason of such engagement. Such engagement, however, tends to swing member 10 about its pivotal mounting but this swinging movement is opposed by button or plunger 16 working in a tubular member 17 which also contains spring 18, acting to oppose inward movement of plunger 16. Adjustment of this spring 18 is controlled by adjusting screw 19. Thus normally driving action will result from engagement of shoulders 12 and 14, but when an overload condition exists, the power required for shoulder 12 to push shoulder 13 becomes so great that member 10 will turn on its pivot 11 in opposition to pressure of spring 18, and thus shoulders 12 and 14 will become disengaged, as shown in Fig. 3. This permits member 9 to slide toward member 8 by reason of inclined surfaces 20 on member 9 and 21 on member 8, said member 9 being pushed toward member 8 by spring 22 on hub 23 of gear 24, which meshes with gear 25 on driven shaft 2. This movement of member 9 toward member 8 permits swinging member 26 pivoted at 27 and having roller 28 traveling on side of member 9 to be swung by spring 30 so that it will act upon plunger 31 and push said plunger inwardly. Such inward motion of the plunger 31 will cause the operation of an electric switch which will open the circuit of an electric motor driving the machine or perform other operation to secure such or other desired result.

The member 26 has its pivot 27 mounted on a bracket 32 held by stationary mounting on the machine, the roller 28 traveling on the side of member 9 as the latter revolves.

Member 9 is mounted on hub 23 by means of screw 36, which also engages member 13 and said hub 23 is splined to collar 37 by sleeves 38 and screws 39, collar 37 being loose on drive shaft 1.

It will be understood that changes and modifications may be made without departing from the spirit of the invention.

What I claim is:

1. The combination of fixed and movable clutch members having interengaging parts, whereof the part on the fixed member is movable and subject to spring pressure tending to prevent its movement by the other part, and means controlled by said movable part for controlling the operation of the machine, said controlling means comprising means for opening the circuit of a driving motor.

2. The combination of fixed and movable clutch members having interengaging parts normally engaging one another, whereof the part on the fixed member is movable and is spring controlled to prevent its movement normally by the other part, said loose member being relatively movable toward and away from the fixed member, and means controlled by said relative movement for controlling the operation of the driving machine.

3. The combination of fixed and movable clutch members having interengaging parts, whereof the part on the fixed member is movable and is spring controlled to prevent its movement normally by the other part, said loose member being relatively movable toward and away from the fixed member, and means controlled by said relative movement for controlling the operation of the machine, said means comprising a spring controlled pivoted member and a plunger actuated by said member.

4. The combination with a rotary drive shaft of clutch members thereon, one of said members being fixed and the other being loose on said shaft, the fixed member being provided with a pivoted engaging dog and also with a spring and adjusting means for opposing the pivoted movement of said dog, and said loose member being provided with a lug having a shoulder to engage said pivoted dog, said loose member being movable toward and away from the fixed member and said members having inclined surfaces to permit relative movement of the loose member, a spring tending to force the loose member toward the fixed member, a pivoted member having a roller traveling on the side of said loose member, a spring tending to swing said pivoted member to force said roller against said side, and a plunger controlled by said pivoted member.

5. In a device of the class specified, clutch members one of which has a fixed shoulder or abutment, and the other of which has a movable member provided with a co-operating and interlocking shoulder or abutment and spring means tending to hold said movable member normally in position to engage the fixed shoulder or abutment but to permit movement of said member and thereby allow disengagement of said members when the load becomes excessive.

In witness whereof, I hereunto subscribe my name this 15th day of December, A. D., 1924.

SEVERIN HALVORSEN.